Figure 4:
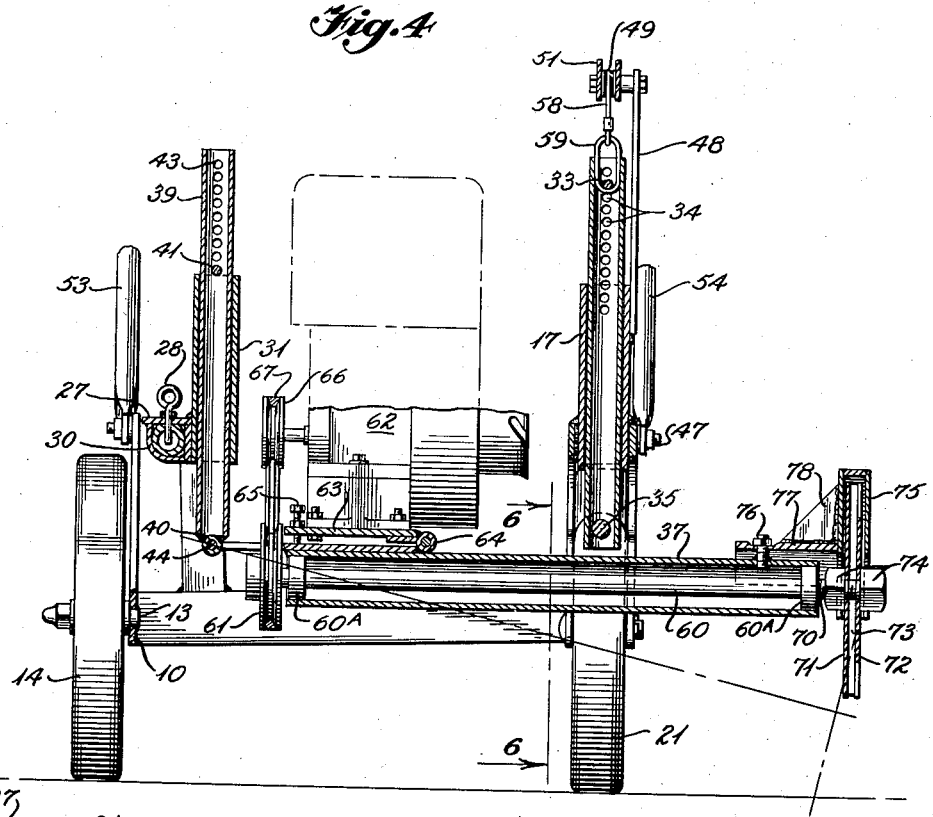

April 21, 1959  A. SMITH ET AL  2,882,977
GARDENING MACHINE
Filed Feb. 8, 1954  4 Sheets-Sheet 1
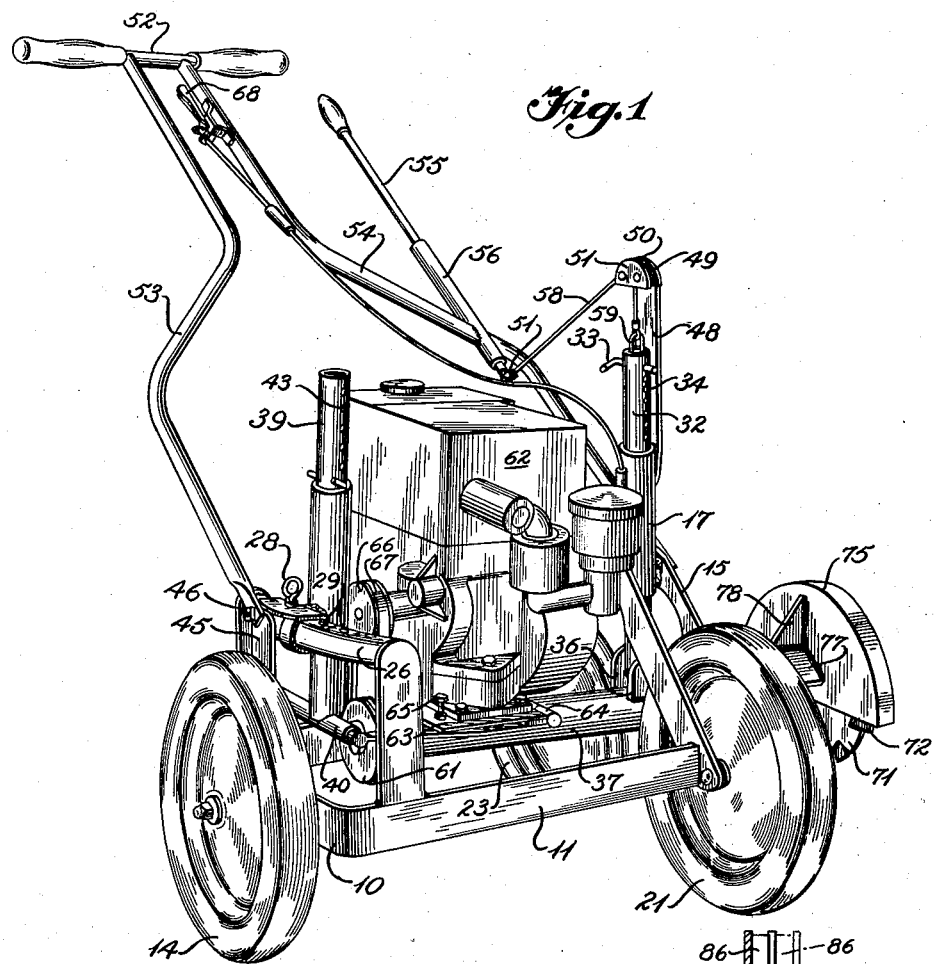
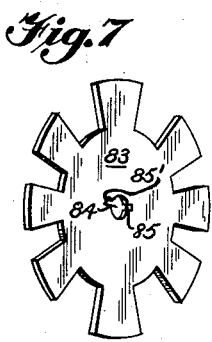
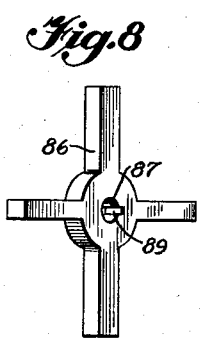
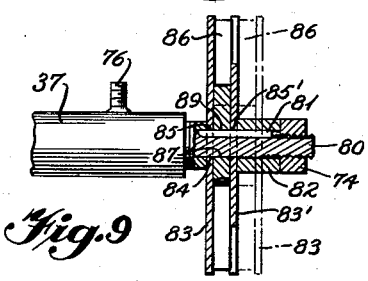
INVENTORS
ALEXANDER SMITH
BURTON D. BAGGS, JR.
BY A. Yates Dowell
ATTORNEY

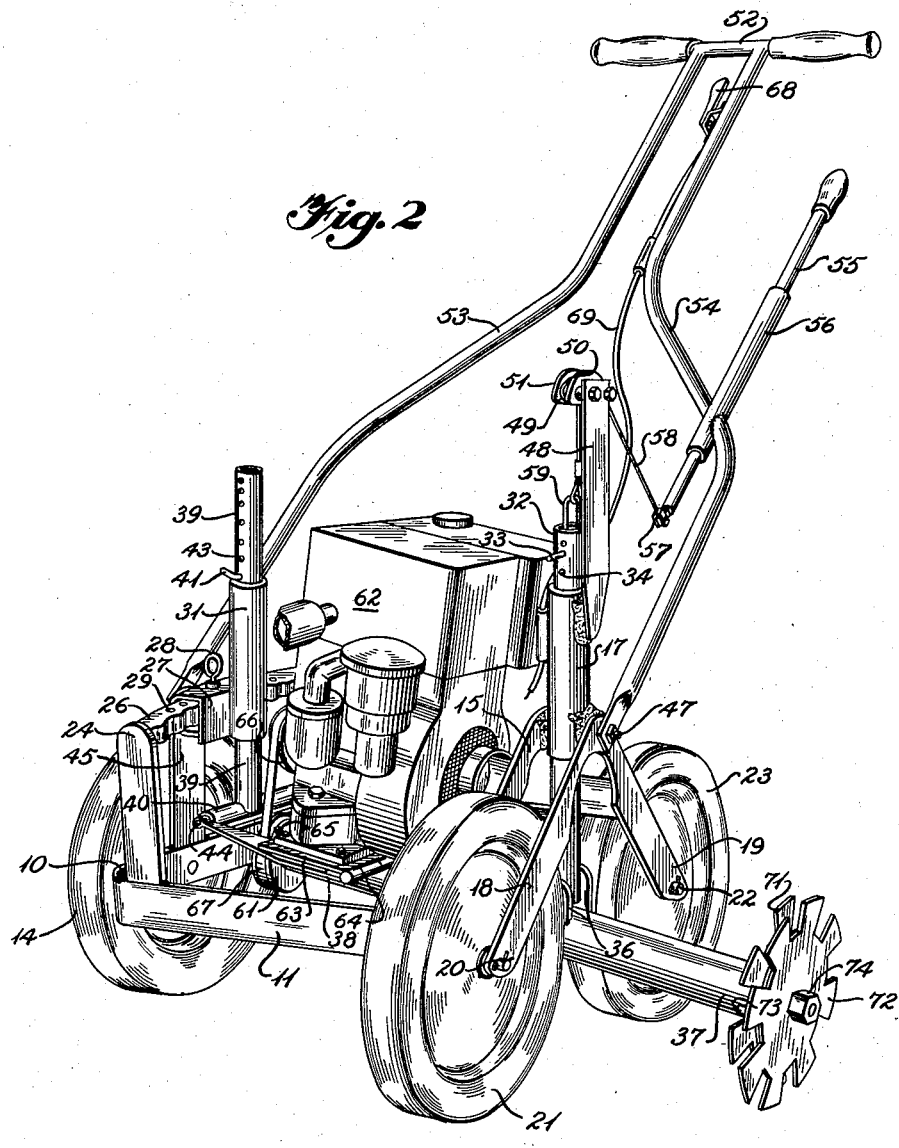

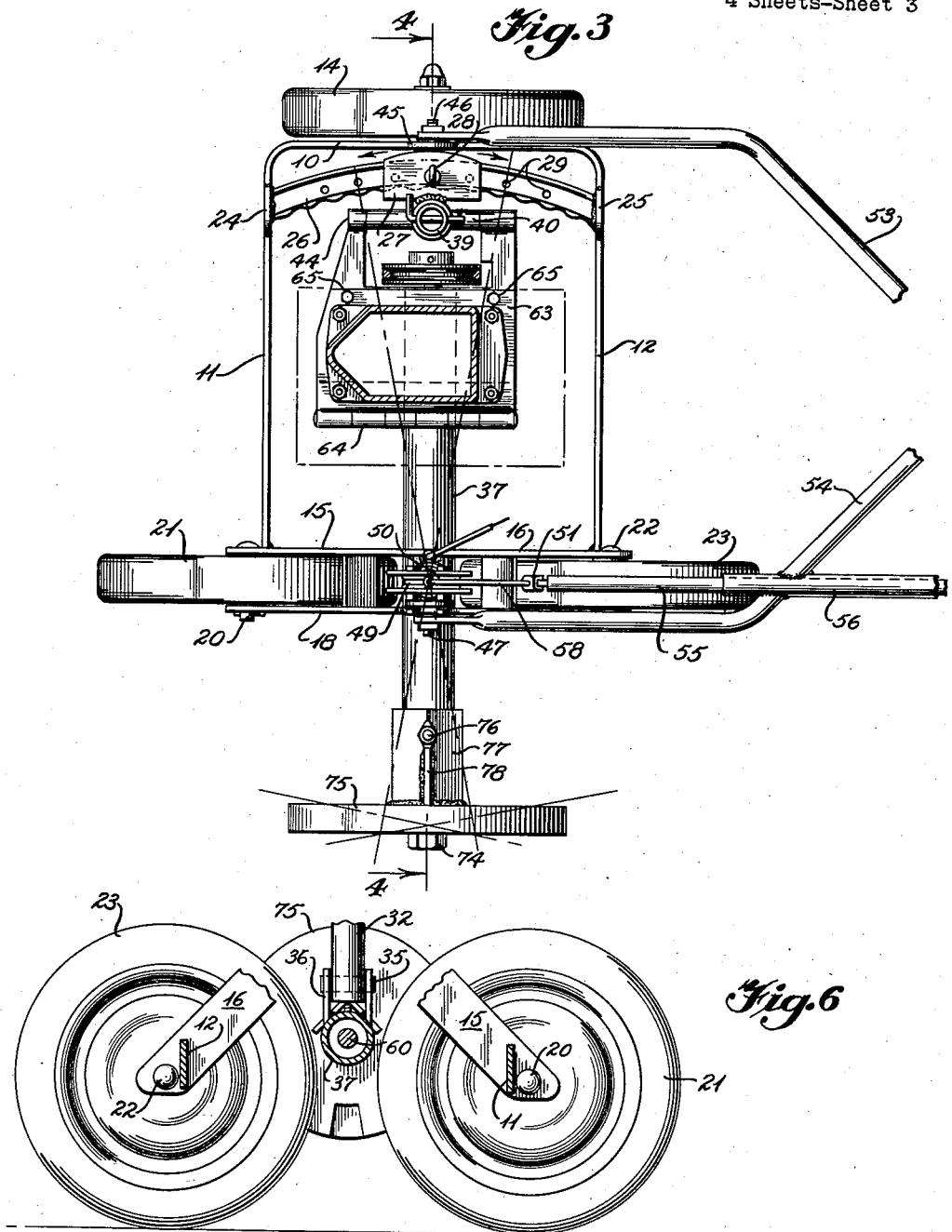

April 21, 1959

A. SMITH ET AL 2,882,977

GARDENING MACHINE

Filed Feb. 8, 1954

4 Sheets-Sheet 4

INVENTORS
ALEXANDER SMITH
BURTON D. BAGGS, JR.

BY *A. Yates Dowell*

ATTORNEY

United States Patent Office 2,882,977
Patented Apr. 21, 1959

2,882,977

GARDENING MACHINE

Alexander Smith and Burton D. Baggs, Jr., Sanford, Fla.

Application February 8, 1954, Serial No. 408,803

5 Claims. (Cl. 172—15)

The present invention relates to a power operated gardening machine and more particularly to a machine for trimming the edges of a lawn at sidewalk and flower bed borders.

The edges of lawns have always been a source of annoyance, since it has been difficult to keep a sharp outline and the grass overgrows the edges of sidewalks, flower beds, and the like resulting in the unsightly appearance of gardens. A conventional mower does not satisfactorily cut the grass to the edges of a lawn and the roots of the grass continuously creep into flower beds thereby detracting from the general appearance of the garden. Further, grass takes a large amount of nutriment from the soil and when such grass extends into the flower beds, the flowers are stunted in their growth.

Although various devices for obtaining the desired sharp edges around lawns have been made, none has been entirely satisfactory. The hand-operated hoe and hand trowel have been used but are not satisfactory where large estates have to be maintained and the labor cost involved in hand methods is excessively high. Various other types of hand tools have been placed on the market and some power tools have been designed, but none of these has proven satisfactory.

An object of the present invention is to provide a machine which will produce a sharp edge on a lawn adjacent the sidewalks, flower beds, and other borders for enhancing the appearance of a lawn and garden.

A further object of the invention is to provide a lawn edger which may be accurately controlled by the operator for producing a trench of desired depth and width by suitably adjusting the device.

Another object of the present invention is to provide a cultivating disk which is safe to use with little danger of serious injury to the operator or persons who may come in contact with the same.

Another object is to provide a machine which may be operated in a forward or reverse direction for performing a gardening operation.

A further object is to provide a power-driven cultivating element with means for adjusting the angularity of the cultivating element with relation to the direction of movement thereof on at least two axes.

Figure 5:
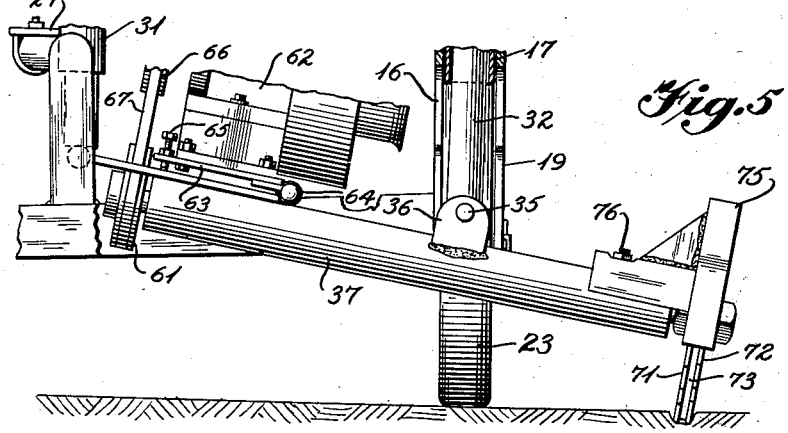

Another and further object will appear as the description proceeds and upon reference to the drawings wherein:

Fig. 1 is a perspective view from the front and right sides of a lawn edger machine;

Fig. 2, a perspective view from the front and left sides of the machine;

Fig. 3, a top plan view with parts in section and parts broken away of the machine;

Fig. 4, a section taken substantially on line 4—4 of Fig. 3, showing the cultivating disk in a raised or inoperative position;

Fig. 5, an elevation with parts broken away and parts omitted showing the cultivator in an operative position;

Fig. 6, a sectional elevation of the machine taken on line 6—6 of Fig. 4 showing the drive shaft and its housing in section and the attachment of the drive shaft housing to handle controlled supporting slide;

Fig. 7, a single disk element suitable for building up a cultivating structure for making a trench of substantial width;

Fig. 8, a spacing element for use in building up a cultivating structure of substantial width; and Fig. 9, an elevation showing a modification with an extended shaft for receiving cultivating structure of substantial width.

Upon more detailed reference to the drawing, the lawn edger of the present invention includes a U-shaped frame having a bight portion 10, a front leg 11, and a rear leg 12 arranged in a generally horizontal position. Fixed centrally of the bight portion is a stub shaft 13 upon which a ground-engaging wheel 14 is rotatably mounted. A first inverted V-shaped member having a front leg 15 and a rear leg 16 is attached to the free ends of legs 11 and 12 respectively of the U-shaped frame member. A first tubular guide 17 is arranged in upstanding relation and fixedly secured to the first inverted V-shaped member by welding or the like, and a second V-shaped member having a forward leg 18 and a rear leg 19 is positioned in substantially parallel relation to the first V-shaped frame member and is fixed to the outer surface of the upstanding tubular guide 17. A wheel shaft 20 passes through the forward ends of arms 15 and 18 and through a wheel 21 for rotatably mounting the wheel between such arms and a second wheel shaft 22 extends between the rear ends of arms 19 and 16 and through a wheel 23, rotatably supporting such wheel. Wheels 14, 21, and 23 support the frame for movement along the ground.

An upright 24 adjacent the front knee of the U-shaped frame and an upright 25 adjacent the rear knee of the U-shaped frame carry a horizontally positioned arcuate-shaped guide member 26 which is substantially concentric with the axis of the upstanding tubular guide 17. A slide 27 made of a section of angle iron and an embracing strap is mounted on arcuate guide 26 for forward and reverse movement and is held in adjusted position by means of a pin 28 passing through an opening in the slide and through one of the openings 29 in the arcuate shaped guide. The slidable guide 27 made of an angular member and a strap 30 completely surrounds the arcuate guide 26 but such slide 27 is sufficiently loose to permit some lost motion.

A second upstanding tubular guide 31 is fixedly mounted on the vertical web of the angle member of slide 27 in substantially parallel relation to said first mentioned tubular guide 17. A first transversely apertured tube 32 is slidably mounted in tubular guide 17 with a portion projecting above such tubular guide for reception of a pin 33 passing through one of the apertures 34 in the slidable tube. The lower portion of the slidable tube 32 is pivotally connected by means of a pin 35 passing through the lower extremity of the slidable tube 32 and through lugs 36 fixedly connected to a tubular housing 37 intermediate the ends of such tubular housing so that the tubular housing may be angularly adjusted with the horizontal and also such tubular housing may be pivoted about the axis of tubular slide 32. The tubular housing 37 extends transversely inwardly and outwardly from the slide tube 32. Upon the inner end of the inwardly extending portion, a horizontally bifurcated plate 38 is fixedly mounted with the tines thereof extending under the arcuate guide 26 and the arcuately movable slide 27. A tubular slide 39, having a sleeve 40 extending across the bottom thereof is slidably mounted in the second tubular guide 31 and has its downward movement limited by means of a pin 41 passing through one of the transverse apertures 43 in the tubular slide 39. A pivot pin 44 passing through horizontal sleeve 40 is secured to the outer ends of the bifurcated member 38 for pivotally connecting the bifurcated plate 38 and thereby housing 37 to the slide 39.

An upright 45 fixed at its lower end to the center of the bight portion 10 projects upwardly to substantially the height of the apex of the V-shaped members and supports a fastening element 46. A similar fastening element 47 is fixed to extend outwardly from the outer inverted V-shaped member.

An upright extension 48 is fixed at its lower end to the upper end of tubular guide 17 and carries pulleys 49 and 50 between the upper end of such upright extension and a plate 51. The pulleys 49 and 50 are rotatably mounted on pivots passing through the upper end of upright 48 and the plate 51 and are suitably secured thereto. A manipulating handle having a hand-engaging cross member 52 at the end thereof is provided with a pair of longitudinally extending and diverging members 53 and 54 having substantially parallel lower ends which are pivotally mounted by means of fastening elements 46 and 47 to the upright 45 and outer inverted V-shaped member respectively whereby the handle serves for guiding the machine along the ground.

An adjusting handle 55 is slidable in a tubular guide 56 mounted in the handle intermediate the ends of the latter and in a vertical plane including tubular guide 17. A clevis 57 is pivotally mounted on the lower end of sliding handle 55 and a flexible cable 58 is secured to such clevis and passes over one of the pulleys 49 or 50 and between such pulleys to an elongated link member 59 to which said cable is fixed. The lower end of the link member embraces the removable pin 33 thereby securing the cable to tubular slide 32 so that a pull on the cable will raise the tubular slide 32 thereby controlling the region of operation. The link 59 may be secured to tubular slide 32 at a number of different points by means of pin 33 passing through such link and through the appropriate aperture. It will be evident that an additional pin may be provided to limit the movement of the tubular slide 32, if desired, and it will be evident that pivotal movement of the guiding handle 52 about pivot elements 46 and 47 will produce tension and lineal displacement of the cable 59 thereby raising or lowering the tubular slide 32 and the attached housing 37. The adjusting handle 55 may be withdrawn sufficiently to completely clear the upper end of upright extension 48 so that the manipulating handle 52 may be used at the front of the machine, and the machine may be pulled if desired or may be pushed rearwardly, as the exigencies of the situation may require.

A shaft 60 is rotatably mounted in housing 37 by suitable bearings 60A which may be ball bearings or roller bearings or the like, and such shaft projects outwardly beyond each end of the housing, the inner end of such shaft carrying a pulley 61 located between the bifurcations of the plate 38. A gasoline motor or other source of power 62 is fixedly mounted on a plate 63 which is hingedly connected by hinge 64 or the like, having one leaf integral with or fixed to the right edge of the bifurcated plate 38 and the other leaf fixed to plate 63 by bolts or the like. Said motor mounting plate 63 may be adjusted for pivotal movement of the motor about hinge 64 by means of adjusting screws 65 passing through such mounting plate 63 and engaging bifurcated plate 38 and being locked in position by a lock nut. The motor has a driving pulley 66 which is connected by means of a belt 67 to the pulley 61 on the shaft 60 and the adjusting screws 65 providing for proper tensioning of such driving belt.

The motor is controlled by means of a hand lever 68 pivotally mounted on handle member 54 and connected by means of a Bowden wire 69 to the carburetor, throttle, or other control mechanism in a conventional manner. The outer end of the shaft 60 is provided with left-handed screw threads 70 and nuts for securing a cultivating element in operative position. The cultivating element includes an inner disk 71 provided with a series of substantially trapezoidal-shaped projections around its periphery and said disk 71 is separated from a similar outer disk 72 by means of radially extending spacing bars 73. The outer disk 72 is also provided with substantially trapezoidal-shaped projections similar to those of the inner disk, the disks being arranged so that the trapezoidal projections are offset and overlap sufficiently to provide a continuous circular contour about the cultivating element. This continuous circular periphery avoids the effect of a saw blade where the teeth project at spaced points, and consequently there is less danger of injuring persons or damaging equipment coming into contact with the cultivator element. The spacing bars 73 are arranged in radial directions at approximately right angles to maintain the disks in proper relation and also to serve as impellers for throwing out accumulated material. These spacing elements 73 are secured by suitable means such as welding or the like for maintaining the disks in proper relation. The cultivator element is fixedly secured by means of nuts 74 for maintaining the cultivator element in driving relation.

A guard 75 is secured to the outer end of housing 37 by means of a screw connection 76, for passing through the ridge of an angular shank 77 which is fixed to the generally semi-cylindrical guard 75 and braced by means of a web 78. The arrangement permits a single fastening element to maintain the parts in assembled relation.

It is believed that the operation of the gardening machine will be clear from the above. The tubular slide 39 is adjusted manually for the proper elevation by the pin 41 and the tubular slide 32 is adjusted by either repositioning the pin 33 or by movement of slide handle 55 and a pivotal movement of the manipulating handle, or by combinations of these for controlling the depth of cut by the cultivator element. The friction between slide handle 55 and tubular guide 56 is normally sufficient to maintain the proper adjusted relation, but a set screw or other fastener element may be provided to maintain the adjustment. This control permits the machine to run on a road while operating at the elevation of a curb to edge trim the lawn at the curb, or the cultivating disk may operate below the surface. The clevis 57 is of a size to pass through tubular guide 56 so that the handle 55 may hang down from the upper end of guide 56 and maintain the manipulating handle in upright position for storing the machine. The angularity of such cut relative to the direction of movement of the vehicle is controlled by the position of slide 27 on arcuate-shaped guide 26, the adjustment being retained by locking pin 28. It will thus be evident that various adjustments corresponding to the dotted line showings in Figs. 3 and 4 of the drawings or in the full line positions in Figs. 3, 4 and 5 can be accomplished in accordance with the nature of the edging channel or trench desired. After the adjustments have been accomplished, the motor is started and the operator merely guides the machine in proper relation to the edge of the sidewalk or flower bed, building, or the like. The direction of rotation of the cultivator element is shown to provide a propelling force in the forward direction so the machine is moved along by the motor and cultivator element and the operator only needs to guide the same.

Referring more particularly to Figs. 7 to 9 inclusive, it will be apparent that the shaft 60 may be increased in length to project outwardly beyond the housing 37 to a great extent as shown by shaft 80 and such shaft 80 is provided with a keyway for receiving a key 81 therein and suitable spacing collars 82 which may be provided with a cooperating keyway to pass over the elongated key 81. For building up a cultivating structure of substantial width or axial dimension, a plurality of disk elements 83 and 83' which may be identical elements have keyways 85 and 85' therein for selective cooperation with the key 81. The keyways 85 and 85' are offset so that a single disk element 83 may have its keyway 85 receiving key 81 and the disk element 83' may have keyway 85' engaging the key 81 thereby offsetting the trapezoidal projections of the disk elements to provide the continuous circumference as shown with relation to disk elements 71, 72. For spacing the disk elements 83 and 83', the star shaped spacers shown in Fig. 8 may be used, said spacers including a hub with a bore 87 therein for receiving the shaft 80 and a keyway 89 for engagement with key 81 for positive rotation of the spacer element, the arms 86 serving to throw the material outwardly similar to spacing bars 73.

If desired, the disks 83 and 83' may be spaced any desired distance by the use of suitable spacing collars 82 and cultivator elements similar to the structure previously recited including disks 72 and spacer bars 73 may be mounted on the shaft 80 and spaced apart by suitable collars 82 to provide any desired spacing between the cultivating elements for obtaining any desired width of trench and for obtaining any desired comminuting of the earth and vegetation thereon. It will be apparent that shaft 80 may be made to project to any desired extent and the guard 75 may be made of a width to accommodate the cultivating elements.

Although the machine is shown to have three wheels, it will be evident that four wheels may be used while obtaining many of the advantages and such four-wheeled construction may have some advantages in some uses.

The machine has been described as particularly useful for the edging of sidewalks and flower beds, and it will also be evident that it may have many other uses including cultivating rows in a garden, preparing the soil for planting and the like. A saw blade may be substituted for the cultivator element for ripping logs, lumber, etc.

It will be obvious to those skilled in the art, that various changes may be made in the invention without departing from the spirit and scope thereof, and therefore, the invention is not limited by that which is shown in the drawings and described in the specification, but only as indicated in the appended claims.

What is claimed is:

1. An agricultural machine comprising a three-wheeled vehicle for motion over the ground, including a chassis having a horizontally positioned U-shaped frame one wheel mounted on the bight of the U-shaped frame and a wheel mounted on the outer end of each of the legs of the frame for rotation about horizontal axes parallel to the legs of the U-shaped frame, an inverted V-shaped arch mounted with its free ends fixed to the free ends of the legs of the U-shaped frame, an upstanding tubular guide fixedly mounted to the apex of the inverted V-shaped arch and outwardly thereof, a second inverted V-shaped arch outwardly of said upstanding tubular guide and fixed to said guide, the wheels on the outer ends of the legs of the frame being supported by the free ends of the arms of the V-shaped arches with a clear vertical space between such wheels and the lower end of the tubular guide, uprights mounted at each knee of the U-shaped frame, an arcuate guide member extending between and secured to said upstanding uprights with the curvature being on a radius about the tubular guide, a slide mounted on said arcuate guide for movement forwardly and rearwardly about the tubular guide as a center, a second upstanding tubular guide mounted on said movable slide and extending substantially parallel to the first tubular guide whereby said tubular guides are maintained in generally parallel equi-spaced relation, a first tubular slide mounted in said first tubular guide for vertical adjustment and provided with a plurality of apertures therethrough for receiving a pin, a second tubular slide mounted in said second tubular guide, a tubular housing hingedly mounted intermediate its ends on the lower end of said first tubular slide, a bifurcated motor mounting plate mounted on the inner end of the housing with bifurcations embracing the ends of a transverse sleeve rigidly connected with the lower end of said second tubular slide, and a pivot connecting said bifurcations and the ends of said transverse sleeve, a shaft rotatably mounted in said housing and projecting from both ends thereof, means for attaching a cultivator element to the outer end of said shaft, a driving pulley fixed on the inner end of said shaft between said bifurcations, a motor supporting plate hingedly mounted on said motor mounting plate for movement about an axis generally horizontal and transverse to the shaft and housing, a motor on said motor supporting plate having a pulley for cooperation with the driving pulley on the shaft, and means for adjusting the motor supporting plate with respect to the motor mounting plate whereby a belt may be adjusted between said motor pulley and said drive pulley, a handle supporting upright extending from the bight of the U-frame, a handle having a pair of spaced generally parallel lower ends with one end pivoted to the handle supporting upright and the other end pivoted to the apex of the outer inverted V-arch, an upright extension on said first tubular guide, a pair of pulleys mounted on said extension one forwardly and one rearwardly of the center line of the first tubular slide, a sleeve on said handle in the vertical plane of said pulleys and of the center line of the first tubular slide, said sleeve clearing said pulleys, a height adjusting handle slidable in the sleeve on said first handle, a cable fixed to the lower end of the slidable handle, means for connecting the other end of the cable to the first tubular slide whereby the first tubular slide may be moved vertically by angular movement of the first handle.

2. A machine for cutting material adjacent the edges of sidewalks, lawns, and curbs comprising a vehicle, a vertically extending guideway mounted on said vehicle adjacent one side thereof, a slide mounted in said vertically extending guideway, a shaft housing pivotally mounted on the lower end of said slide and having a portion projecting outwardly beyond said one side of said vehicle, a motor mounted on said vehicle, a shaft rotatably mounted in said housing and drivingly connected to said motor and having a portion projecting beyond said one side of said vehicle, a cutter element fixed on said shaft spaced outwardly from said one side of said vehicle, means to maintain said slide in a definite vertical position and means in addition to said slide for adjustably retaining said housing in a definite position with respect to said vehicle whereby the angularity of said shaft and the cutter element may be varied with respect to the ground and with respect to the path of movement of said vehicle.

3. A machine for cutting vegetation adjacent the edges of sidewalks and curbs comprising a vehicle, a vertically extending guideway, a slide mounted in said vertically extending guideway for vertical and pivotal movement, a shaft housing pivotally mounted on the lower end of said slide and having a portion projecting outwardly beyond said one side of said vehicle, a motor mounted on said vehicle, a shaft rotatably mounted in said housing and drivingly connected to said motor and having a portion projecting beyond said one side of said vehicle, a cutter fixed on said shaft spaced outwardly from said one side of said vehicle, means to maintain said slide in a definite vertical position and means in addition to said slide for adjustably retaining said housing in a definite position whereby the angularity of said shaft may be varied with respect to the ground and with respect to the path of movement of said vehicle.

4. A lawn edger comprising a vehicle having at least three ground engaging means with at least one ground engaging means out of alignment with the others for movement along a surface, a shaft housing extending transversely to the direction of movement of said vehicle and pivotally mounted on one end for vertical swinging movement about a generally horizontal axis extending in the direction of movement of the vehicle and located at one side of said vehicle, a shaft rotatably mounted in said housing and projecting outwardly beyond the other side of said vehicle, power means carried by said vehicle and drivingly connected to said shaft to rotate said shaft, a cutting disk fixed to the outer end of said shaft, and additional means mounting said shaft and said housing on said vehicle for vertical translation relative to said vehicle whereby the cutter may be raised or lowered with respect to the supporting surface, said additional means including a vertically extending pivot adjacent the other side of the vehicle about which pivot the pivotal mounting of the said one end of said housing may be arcuately moved relative to said vehicle whereby the angularity of the cutter with respect to the direction of movement of the vehicle may be controlled to obtain a trench substantially the axial dimension of the cutting element or a trench of greater width having upwardly flaring side walls.

5. A lawn edger for cutting vegetation away from the edge of a curb, said edger comprising a vehicle for movement along the road beside a curb, a housing mounted on the vehicle, a single shaft rotatively mounted in said housing, means mounting said housing and shaft on said vehicle for vertical translation and tilting relative to said vehicle, cutting disk means mounted on said shaft outwardly of the wheels of said vehicle whereby the cutting action may be accomplished at a substantial distance from the wheels, said distance being at least equal to the width of a curb, power means on the vehicle for driving the shaft, and handle means for rapidly and accurately raising and lowering the shaft with the cutting disk means thereon to provide for the proper adjustment of the cutting blades with relation to the curb, additional means to mount said housing on said vehicle for angular adjustment about a vertical axis relative to said vehicle so the angle may be changed from a right angle with respect to the line of movement of the vehicle to acute or obtuse angles with respect to the line of movement of the vehicle whereby the width of cutting can be controlled.

References Cited in the file of this patent
UNITED STATES PATENTS

| | | |
|---|---|---|
| 339,359 | Akins | Apr. 6, 1886 |
| 383,286 | Evans | May 22, 1888 |
| 1,819,950 | Dufour | Aug. 18, 1931 |
| 2,139,353 | Bruder | Dec. 6, 1938 |
| 2,151,117 | Kepler | Mar. 21, 1939 |
| 2,312,569 | Maga | Mar. 2, 1943 |
| 2,432,922 | Muzzy | Dec. 16, 1947 |
| 2,465,660 | Phillips | Mar. 29, 1949 |
| 2,525,944 | Ralston | Oct. 17, 1950 |
| 2,538,230 | Boggs | Jan. 16, 1951 |
| 2,539,174 | Baideme et al. | Jan. 23, 1951 |
| 2,555,441 | Hackney | June 5, 1951 |
| 2,592,450 | Mjelva | Apr. 8, 1952 |
| 2,608,043 | Berdan | Aug. 26, 1952 |
| 2,614,473 | Yacoby | Oct. 21, 1952 |
| 2,618,919 | Hutchens | Nov. 25, 1952 |
| 2,624,905 | Howard | Jan. 13, 1953 |
| 2,630,052 | Jory | Mar. 3, 1953 |
| 2,630,747 | Mintz | Mar. 10, 1953 |
| 2,668,487 | Marihart | Feb. 9, 1954 |